United States Patent
Cho et al.

(10) Patent No.: US 9,670,992 B2
(45) Date of Patent: Jun. 6, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/886,947

(22) Filed: Oct. 19, 2015

(65) Prior Publication Data
US 2016/0333971 A1    Nov. 17, 2016

(30) Foreign Application Priority Data

May 13, 2015   (KR) .................... 10-2015-0066910

(51) Int. Cl.
*F16H 3/62*    (2006.01)
*F16H 3/66*    (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC .............. F16H 3/62; F16H 2200/0069; F16H 2200/0078; F16H 2200/2012; F16H 2200/2046
See application file for complete search history.

(56) References Cited

U.S. PATENT DOCUMENTS

2010/0210395 A1* 8/2010 Phillips .................. F16H 3/666
475/275
2011/0245013 A1* 10/2011 Kim ....................... F16H 3/666
475/271

(Continued)

FOREIGN PATENT DOCUMENTS

KR    10-2013-0077146 A     7/2013
KR         10-1317142 B1   10/2013

(Continued)

*Primary Examiner* — Huan Le
(74) *Attorney, Agent, or Firm* — Morgan Lewis & Bockius LLP

(57) ABSTRACT

A planetary gear train of an automatic transmission for a vehicle may include an input shaft receiving torque of an engine, an output shaft outputting changed torque of the engine, a first planetary gear set, a second planetary gear set, a third planetary gear set, a fourth planetary gear set, a first rotation shaft selectively connected to a transmission housing, a second rotation shaft, a third rotation shaft selectively connected to the transmission housing, a fourth rotation shaft directly connected to the input shaft, a fifth rotation shaft, a sixth rotation shaft selectively connected to the second and fourth rotation shafts, a seventh rotation shaft selectively connected the second rotation shaft, an eighth rotation shaft selectively connected to the seventh rotation shaft, and directly connected to the output shaft, and six friction elements disposed to selectively connect the rotation shafts and selectively connect the rotation shafts with the transmission housing.

10 Claims, 3 Drawing Sheets

(56) References Cited

U.S. PATENT DOCUMENTS

2012/0231917 A1* 9/2012 Phillips .............. G06F 11/3688
   475/276
2013/0203550 A1* 8/2013 Mellet ...................... F16H 3/66
   475/276

FOREIGN PATENT DOCUMENTS

| KR | 10-1416108 B1 | 7/2014 |
| KR | 10-1509726 B1 | 4/2015 |

* cited by examiner

FIG. 2

|      | C1 | C2 | C3 | C4 | B1 | B2 |
|------|----|----|----|----|----|----|
| 1ST  |    |    | ○  | ○  |    | ○  |
| 2ND  |    | ○  |    | ○  |    | ○  |
| 3RD  |    | ○  |    |    | ○  | ○  |
| 4TH  | ○  | ○  |    |    |    | ○  |
| 5TH  | ○  | ○  |    |    | ○  |    |
| 6TH  | ○  | ○  |    | ○  |    |    |
| 7TH  | ○  |    |    | ○  | ○  |    |
| 8TH  | ○  |    | ○  |    | ○  |    |
| 9TH  |    |    | ○  | ○  | ○  |    |
| 10TH |    | ○  | ○  |    | ○  |    |
| REV  | ○  |    | ○  |    |    | ○  |

FIG. 3

|      | C1 | C2 | C3 | C4 | B1 | B2 |
|------|----|----|----|----|----|----|
| 1ST  | ○  |    | ○  |    |    | ○  |
| 2ND  |    |    | ○  | ○  |    | ○  |
| 3RD  |    | ○  | ○  |    |    | ○  |
| 4TH  |    | ○  |    | ○  |    | ○  |
| 5TH  |    | ○  |    |    | ○  | ○  |
| 6TH  | ○  | ○  |    |    |    | ○  |
| 7TH  | ○  | ○  |    |    | ○  |    |
| 8TH  | ○  | ○  |    | ○  |    |    |
| 9TH  | ○  |    |    | ○  | ○  |    |
| 10TH | ○  |    | ○  |    | ○  |    |
| 11TH |    |    | ○  | ○  | ○  |    |
| 12TH |    | ○  | ○  |    | ○  |    |
| REV  | ○  |    |    | ○  |    | ○  |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0066910 filed May 13, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train for an automatic transmission of a vehicle that improves power delivery performance and reduces fuel consumption by achieving ten forward speed stages or twelve forward speed stages using a minimum number of constituent elements.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of transmission speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8- and 9-speed automated transmissions have tended to be achieved, and the research and development of a planetary gear train capable of implementing more transmission steps has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving ten forward speed stages and one reverse speed stage or twelve forward speed stages and one reverse speed stage using a minimum number of constituent elements and of improving silent driving using a driving point positioned at a low engine speed.

According to various aspects of the present invention, a planetary gear train of an automatic transmission for a vehicle may include an input shaft receiving torque of an engine, an output shaft outputting changed torque of the engine, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first rotation shaft including the first and second sun gears and selectively connected to a transmission housing, a second rotation shaft including the first planet carrier, a third rotation shaft including the first and fourth ring gears and selectively connected to the transmission housing, a fourth rotation shaft including the second planet carrier and directly connected to the input shaft, a fifth rotation shaft including the second ring gear and the third and fourth sun gears, a sixth rotation shaft including the third planet carrier and selectively connected to the second and fourth rotation shafts, a seventh rotation shaft including the third ring gear and selectively connected the second rotation shaft, an eighth rotation shaft including the fourth planet carrier and selectively connected to the seventh rotation shaft, and directly connected to the output shaft, and six friction elements disposed to selectively connect the rotation shafts and selectively connect the rotation shafts with the transmission housing.

The first, second, third, and fourth planetary gear sets may be single pinion planetary gear sets.

The first, second, third, and fourth planetary gear sets may be disposed sequentially from an engine side.

The six friction elements may include a first clutch interposed between the fourth rotation shaft and the sixth rotation shaft, a second clutch interposed between the seventh rotation shaft and the eighth rotation shaft, a third clutch interposed between the second rotation shaft and the sixth rotation shaft, a fourth clutch interposed between the second rotation shaft and the seventh rotation shaft, a first brake interposed between the first rotation shaft and the transmission housing, and a second brake interposed between the third rotation shaft and the transmission housing.

Shift speed stages achieved by selectively operating the six friction elements may include a first forward speed stage achieved by simultaneous operation of the third and fourth clutches and the second brake, a second forward speed stage achieved by simultaneous operation of the second and fourth clutches and the second brake, a third forward speed stage achieved by simultaneous operation of the second clutch and the first and second brakes, a fourth forward speed stage achieved by simultaneous operation of the first and second clutches and the second brake, a fifth forward speed stage achieved by simultaneous operation of the first and second clutches and the first brake, a sixth forward speed stage achieved by simultaneous operation of the first, second, and fourth clutches, a seventh forward speed stage achieved by simultaneous operation of the first and fourth clutches and the first brake, an eighth forward speed stage achieved by simultaneous operation of the first and third clutches and the first brake, a ninth forward speed stage achieved by simultaneous operation of the third and fourth clutches and the first brake, a tenth forward speed stage achieved by simultaneous operation of the second and third clutches and the first brake, and a reverse speed stage achieved by simultaneous operation of the first and third clutches and the second brake.

Shift speed stages achieved by selectively operating the six friction elements may include a first forward speed stage achieved by simultaneous operation of the first and third clutches and the second brake, a second forward speed stage achieved by simultaneous operation of the third and fourth clutches and the second brake, a third forward speed stage achieved by simultaneous operation of the second and third clutches and the second brake, a fourth forward speed stage achieved by simultaneous operation of the second and fourth clutches and the second brake, a fifth forward speed stage achieved by simultaneous operation of the second clutch and the first and second brakes, a sixth forward speed stage achieved by simultaneous operation of the first and second clutches and the second brake, a seventh forward speed stage achieved by simultaneous operation of the first and second clutches and the first brake, an eighth forward speed stage achieved by simultaneous operation of the first, second, and fourth clutches, a ninth forward speed stage achieved by simultaneous operation of the first and fourth clutches and the first brake, a tenth forward speed stage achieved by simultaneous operation of the first and third clutches and the first brake, an eleventh forward speed stage achieved by simultaneous operation of the third and fourth clutches and the first brake, a twelfth forward speed stage achieved by simultaneous operation of the second and third clutches and the first brake, and a reverse speed stage achieved by simultaneous operation of the first and fourth clutches and the second brake.

According to various aspects of the present invention, a planetary gear train of an automatic transmission for a vehicle may include an input shaft receiving torque of an engine, an output shaft outputting changed torque of the engine, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first clutch selectively connecting the second planet carrier and the third planet carrier, a second clutch selectively connecting the third ring gear and the fourth planet carrier, a third clutch selectively connecting the first planet carrier and the third planet carrier, a fourth clutch selectively connecting the first planet carrier and the third ring gear, a first brake selectively connecting the first and second sun gears and the transmission housing, and a second brake selectively connecting the first ring gear and the transmission housing, in which the input shaft may be directly connected to the second planet carrier, the output shaft may be directly connected to the fourth planet carrier, the first sun gear may be directly connected to the second sun gear, the first ring gear may be directly connected to the fourth ring gear, and the second ring gear and the third sun gear may be directly connected to the fourth sun gear.

Various embodiments of the present invention may achieve ten forward speed stages or twelve forward speed stages by combining four planetary gear sets which are formed of simple planetary gear sets with six friction elements. Therefore, power delivery performance and fuel economy may be improved.

Also, silent drivability of vehicle may be improved greatly through the multiple speed stages of the automatic transmission appropriate to the engine rotation speed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the exemplary planetary gear train according to the present invention for achieving ten forward speed stages and one reverse speed stage.

FIG. 3 is an operation chart of friction elements at each speed stage in the exemplary planetary gear train according to the present invention for achieving twelve forward speed stages and one reverse speed stage.

Figure 1:
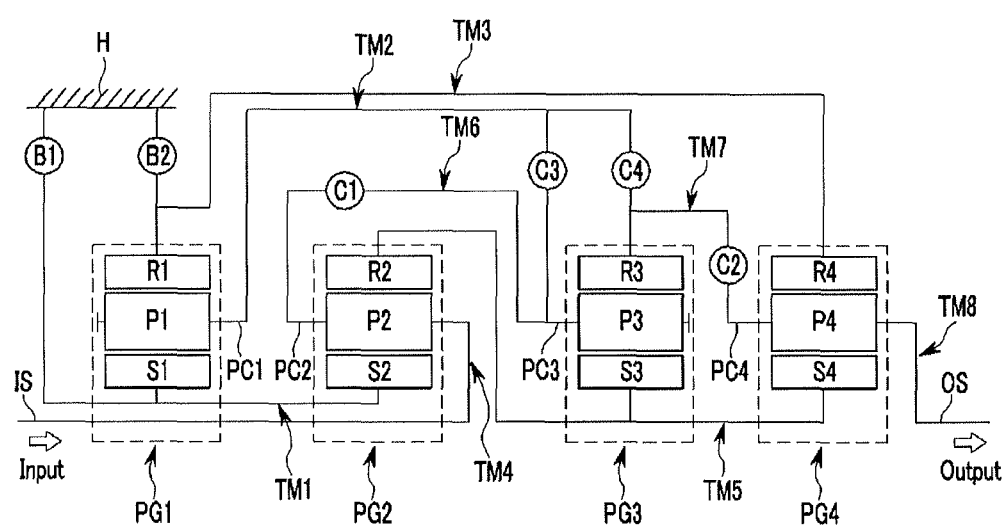
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 disposed on the same axis, and an input shaft IS, an output shaft OS, eight rotation shafts TM1 to TM8 directly connecting to each other and respective rotation elements of the first, second, third, and fourth planetary gear sets PG1, PG2, PG3, and PG4, six friction elements C1 to C4 and B1 to B2, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 as a single-pinion planetary gear set includes a first sun gear S1, a first planetary carrier PC 1 that supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that supports a second pinion P2 which outer-engages with the second sun gear S2, and a second ring gear R2 which inner-engages with the second pinion P2.

The third planetary gear set PG3 as a single-pinion planetary gear set includes a third sun gear S3, a third planetary carrier PC3 that supports a third pinion P3 which outer-engages with the third sun gear S3, and a third ring gear R3 which inner-engages with the third pinion P3.

The fourth planetary gear set PG4 as a single-pinion planetary gear set includes a fourth sun gear S4, a fourth planetary carrier PC4 that supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, one or more rotation elements are directly connected to each other to operate with a total of eight rotational shafts TM1 to TM8.

Configurations of the eight rotational shafts TM1 to TM8 will be described below.

The first rotation shaft TM1 includes the first and second sun gears S1 and S2, and is selectively connected to the transmission housing H.

The second rotation shaft TM2 includes the first planet carrier PC1.

The third rotation shaft TM3 includes the first and fourth ring gears R1 and R4, and is selectively connected to the transmission housing H.

The fourth rotation shaft TM4 includes the second planet carrier PC1, and is directly connected to the input shaft IS so as to always be operated as an input element.

The fifth rotation shaft TM5 includes the second ring gear R2 and the third and fourth sun gears S3 and S4.

The sixth rotation shaft TM6 includes the third planet carrier PC3, and is selectively connected to the second rotation shaft TM2 and the fourth rotation shaft TM4.

The seventh rotation shaft TM7 includes the third ring gear R3, and is selectively connected to the second rotation shaft TM2.

The eighth rotation shaft TM8 includes the fourth planet carrier PC4, is selectively connected to the seventh rotation shaft TM7, and is directly connected to the output shaft OS so as to always be operated as an output element.

In addition, among the rotation shafts TM1-TM8, four clutches C1, C2, C3, and C4 which are friction elements are disposed at connection portions where the rotation shafts are connected to each other.

In addition, among the rotational shafts TM1 to TM8, two brakes B1 and B2 which are friction elements are disposed at connection portions between any one rotation shaft and the transmission housing H.

The six frictional elements C1 to C4 and B1 and B2 will be described in further detail.

The first clutch C1 is interposed between the fourth rotation shaft TM4 and the sixth rotation shaft TM6, and selectively connects the fourth rotation shaft TM4 and the sixth rotation shaft TM6.

The second clutch C2 is interposed between the seventh rotation shaft TM7 and the eighth rotation shaft TM8, and selectively connects the seventh rotation shaft TM7 and the eighth rotation shaft TM8.

The third clutch C3 is interposed between the second rotation shaft TM2 and the sixth rotation shaft TM6, and selectively connects the second rotation shaft TM2 and the sixth rotation shaft TM6.

The fourth clutch C4 is interposed between the second rotation shaft TM2 and the seventh rotation shaft TM7, and selectively connects the second rotation shaft TM2 and the seventh rotation shaft TM7.

The first brake B1 is interposed between the first rotation shaft TM1 and the transmission housing H, and selective causes the first rotation shaft TM1 to be operated as a fixed element.

The second brake B2 is interposed between the third rotation shaft TM3 and the transmission housing H, and selective causes the third rotation shaft TM3 to be operated as a fixed element.

The friction elements including the first, second, third, and fourth clutches C1, C2, C3, and C4 and the first and second brakes B1 and B2 may be multi-plate friction elements of a wet type that are operated by hydraulic pressure.

FIG. 2 is an operation chart of friction elements at each speed stage in the planetary gear train according to various embodiments of the present invention for achieving ten forward speed stages and one reverse speed stage.

As shown in FIG. 2, three friction elements are operated at each speed stage in the planetary gear train according to various embodiments of the present invention.

A first forward speed stage 1ST is achieved by simultaneous operation of the third and fourth clutches C3 and C4 and the second brake B2.

A second forward speed stage 2ND is achieved by simultaneous operation of the second and fourth clutches C2 and C4 and the second brake B2.

A third forward speed stage 2ND is achieved by simultaneous operation of the second clutch C2 and the first and second brakes B1 and B2.

A fourth forward speed stage 4TH is achieved by simultaneous operation of the first and second clutches C1 and C2 and the second brake B2.

A fifth forward speed stage 5TH is achieved by simultaneous operation of the first and second clutches C1 and C2 and the first brake B1.

A sixth forward speed stage 6TH is achieved by simultaneous operation of the first, second, and fourth clutches C1, C2, and C4.

A seventh forward speed stage 7TH is achieved by simultaneous operation of the first and fourth clutches C1 and C4 and the first brake B1.

An eighth forward speed stage 8TH is achieved by simultaneous operation of the first and third clutches C1 and C3 and the first brake B1.

A ninth forward speed stage 9TH is achieved by simultaneous operation of the third and fourth clutches C3 and C4 and the first brake B1.

A tenth forward speed stage 10TH is achieved by simultaneous operation of the second and third clutches C2 and C3 and the first brake B1.

A reverse speed stage REV is achieved by simultaneous operation of the first and third clutches C1 and C3 and the second brake B2.

The shifting processes will be described in further detail.

The third and fourth clutches C3 and C4 and the second brake B2 are simultaneously operated at the first forward speed stage 1ST. In a state in which the second rotation shaft TM2 is connected to the sixth and seventh rotation shafts TM6 and TM7, the input is made into the fourth rotation shaft TM4, and the third rotation shaft TM3 is operated as the fixed elements, the first forward speed stage 1ST is achieved.

The second and fourth clutches C2 and C4 and the second brake B2 are simultaneously operated at the second forward speed stage 2ND. In a state in which the second rotation shaft TM2 is connected to the seventh rotation shaft TM7, the seventh rotation shaft TM7 is connected to the eighth rotation shaft TM8, the input is made into the fourth rotation shaft TM4, and the third rotation shaft TM3 is operated as the fixed element, the second forward speed stage 2ND is achieved.

The second clutch C2 and the first and second brakes B1 and B2 are simultaneously operated at the third forward speed stage 3RD. In a state in which the seventh rotation shaft TM7 is connected to the eighth rotation shaft TM8, the input is made into the fourth rotation shaft TM4, and the first and third rotation shafts TM1 and TM3 are operated as the fixed element, the third forward speed stage 3RD is achieved.

The first and second clutches C1 and C2 and the second brake B2 are simultaneously operated at the fourth forward speed stage 4TH. In a state in which the fourth rotation shaft TM4 is connected to the sixth rotation shaft TM6, the seventh rotation shaft TM7 is connected to the eighth rotation shaft TM8, the input is made into the fourth rotation shaft TM4, and the third rotation shaft TM3 is operated as the fixed element, the fourth forward speed stage 4TH is achieved.

The first and second clutches C1 and C2 and the first brake B1 are simultaneously operated at the fifth forward speed stage 5TH. In a state in which the fourth rotation shaft TM4 is connected to the sixth rotation shaft TM6, the seventh rotation shaft TM7 is connected the eighth rotation shaft TM8, the input is made into the fourth rotation shaft TM4, and the first rotation shaft TM1 is operated as the fixed element, the fifth forward speed stage 5TH is achieved.

The first, second, fourth clutches C1, C2, and C4 are simultaneously operated at the sixth forward speed stage 6TH. In a state in which the fourth rotation shaft TM4 is connected to the sixth rotation shaft TM6, the second rotation shaft TM2 is connected to the seventh rotation shaft TM7, the seventh rotation shaft TM7 is connected to the eighth rotation shaft TM8, and the input is made into the fourth rotation shaft TM4, the sixth forward speed stage 6TH for just outputting the input is achieved as all of the first, second, third, and fourth planetary gear sets PG1, PG2, PG3, and PG4 integrally rotate at the same speed.

The first and fourth clutches C1 and C4 and the first brake B1 are simultaneously operated at the seventh forward speed stage 7TH. In a state in which the fourth rotation shaft TM4 is connected to the sixth rotation shaft TM6, the second rotation shaft TM2 is connected to the seventh rotation shaft TM7, the input is made into the fourth rotation shaft TM4, and the first rotation shaft TM1 is operated as the fixed element, the seventh forward speed stage 7TH is achieved.

The first and third clutches C1 and C3 and the first brake B1 are simultaneously operated at the eighth forward speed stage 8TH. In a state in which the fourth rotation shaft TM4 is connected to the sixth rotation shaft TM6, the second rotation shaft TM2 is connected to the sixth rotation shaft TM6, the input is made into the fourth rotation shaft TM4, and the first rotation shaft TM1 is operated as the fixed element, the eighth forward speed stage 8TH is achieved.

The third and fourth clutches C3 and C4 and the first brake B1 are simultaneously operated at the ninth forward speed stage 9TH. In a state in which the second rotation shaft TM2 is connected to the sixth and seventh rotation shafts TM6 and TM7, the input is made into the fourth rotation shaft TM4, and the first rotation shaft TM1 is operated as the fixed element, the ninth forward speed stage 9TH is achieved.

The second and third clutches C2 and C3 and the first brake B1 are simultaneously operated at the tenth forward speed stage 10TH. In a state in which the second rotation shaft TM2 is connected the sixth rotation shaft TM6, and seventh rotation shaft TM7 is connected to the eighth rotation shaft TM8, the input is made into the fourth rotation shaft TM4, and the first rotation shaft TM1 is operated as the fixed element, the tenth forward speed stage 10TH is achieved.

The first and third clutches C1 and C3 and the second brake B2 are simultaneously operated at the reverse speed stage REV. In a state in which the sixth rotation shaft TM6 is connected to the second and fourth rotation shafts TM2 and TM4, the input is made into the fourth rotation shaft TM4, and the third rotation shaft TM3 is operated as the fixed element, the reverse speed stage REV is achieved.

The planetary gear train according to various embodiments of the present invention may achieve ten forward speed stages and one reverse speed stage by control of four planetary gear sets PG1, PG2, PG3, and PG4, four clutches C1, C2, C3, and C4, and two brakes B1 and B2.

FIG. 3 is an operation chart of friction elements at each speed stage in the planetary gear train according to various embodiments of the present invention for achieving twelve forward speed stages and one reverse speed stage.

As shown in FIG. 3, three friction elements are operated at each speed stage even while shifting twelve forward speed stages and one reverse speed stage.

A first forward speed stage 1ST is achieved by simultaneous operation of the first and third clutches C1 and C3 and the second brake B1.

The second forward speed stage 2ND is achieved by simultaneous operation of the third and fourth clutches C3 and C4 and the second brake B2.

The third forward speed stage 3RD is achieved by simultaneous operation of the second and third clutches C2 and C3 and the second brake B2.

The fourth forward speed stage 4TH is achieved by simultaneous operation of the second and fourth clutches C2 and C4 and the second brake B2.

The fifth forward speed stage 5TH is achieved by simultaneous operation of the second clutch C2 and the first and second brakes B1 and B2.

The sixth forward speed stage 6TH is achieved by simultaneous operation of the first and second clutches C1 and C2 and the second brake B2.

The seventh forward speed stage 7TH is achieved by simultaneous operation of the first and second clutches C1 and C2 and the first brake B1.

The eighth forward speed stage 8TH is achieved by simultaneous operation of the first, second, and fourth clutches C1, C2, and C4.

The ninth forward speed stage 9TH is achieved by simultaneous operation of the first and fourth clutches C1 and C4 and the first brake B1.

The tenth forward speed stage 10TH is achieved by simultaneous operation of the first and third clutches C1 and C3 and the first brake B1.

The eleventh forward speed stage 11TH is achieved by simultaneous operation of the third and fourth clutches C3 and C4 and the first brake B1.

The twelfth forward speed stage 12TH is achieved by simultaneous operation of the second and third clutches C2 and C3 and the first brake B1.

The reverse speed stage REV is achieved by simultaneous operation of the first and fourth clutches C1 and C4 and the second brake B2.

The shifting processes will be described in further detail.

The first and third clutches C1 and C3 and the second brake B2 are simultaneously operated at the first forward speed stage 1ST. In a state in which the fourth rotation shaft TM4 is connected to the sixth rotation shaft TM6, the second rotation shaft TM2 is connected to the seventh rotation shaft TM7, the input is made into the fourth rotation shaft TM4, and the third rotation shaft TM3 is operated as the fixed element, the first forward speed stage 1ST is achieved.

The third and fourth clutches C3 and C4 and the second brake B2 are simultaneously operated at the second forward speed stage 2ND. In a state in which the second rotation shaft TM2 is connected to the sixth and seventh rotation shafts TM6 and TM7, the input is made into the fourth rotation shaft TM4, and the third rotation shaft TM3 is operated as the fixed element, the second forward speed stage 2ND is achieved.

The second and third clutches C2 and C3 and the second brake B2 are simultaneously operated at the third forward speed stage 3RD. In a state in which the second rotation shaft TM2 is connected to the sixth rotation shaft TM6, the seventh rotation shaft TM7 is connected to the eighth rotation shaft TM8, the input is made into the fourth rotation shaft TM4, and the third rotation shaft TM3 is operated as the fixed element, the third forward speed stage 3RD is achieved.

The second and fourth clutches C2 and C4 and the second brake B2 are simultaneously operated at the fourth forward speed stage 4TH. In a state in which the second rotation shaft TM2 is connected to the seventh rotation shaft TM7, the seventh rotation shaft TM7 is connected to the eighth rotation shaft TM8, the input is made into the fourth rotation shaft TM4, and the third rotation shaft TM3 is operated as the fixed element, the fourth forward speed stage 4TH is achieved.

The second clutch C2 and the first and second brakes B1 and B2 are simultaneously operated at the fifth forward speed stage 5TH. In a state in which the seventh rotation shaft TM7 is connected to the eighth rotation shaft TM8, the input is made into the fourth rotation shaft TM4, and the first and second rotation shafts TM1 and TM2 are operated as the fixed element, the fifth forward speed stage 5TH is achieved.

The first and second clutches C1 and C2 and the second brake B2 are simultaneously operated at the sixth forward speed stage 6TH. In a state in which the fourth rotation shaft TM4 is connected to the sixth rotation shaft TM6, the seventh rotation shaft TM7 is connected to the eighth rotation shaft TM8, the input is made into the fourth rotation shaft TM4, and the third rotation shaft TM3 is operated as the fixed element, the sixth forward speed stage 6TH is achieved.

The first and second clutches C1 and C2 and the first brake B1 are simultaneously operated at the seventh forward speed stage 7TH. In a state in which the fourth rotation shaft TM4 is connected to the sixth rotation shaft TM6, the seventh rotation shaft TM7 is connected to the eighth rotation shaft TM8, input is made into the fourth rotation shaft TM4, and the first rotation shaft TM1 is operated as the fixed element, the seventh forward speed stage 7TH is achieved.

The first, second, and fourth clutches C1, C2, and C4 are simultaneously operated at the eighth forward speed stage 8TH. In a state in which the fourth rotation shaft TM4 is connected to the sixth rotation shaft TM6, the second rotation shaft TM2 is connected to the seventh rotation shaft TM7, the seventh rotation shaft TM7 is connected to the eighth rotation shaft TM8, and the input is made into the fourth rotation shaft TM4, the eighth forward speed stage 8TH for just outputting the input is achieved as all of the first, second, third, and fourth planetary gear sets PG1, PG2, PG3, and PG4 integrally rotate at the same speed.

The first and fourth clutches C1 and C4 and the first brake B1 are simultaneously operated at the ninth forward speed stage 9TH. In a state in which the fourth rotation shaft TM4 is connected to the sixth rotation shaft TM6, the second rotation shaft TM2 is connected to the seventh rotation shaft TM7, the input is made into the fourth rotation shaft TM4, and the first rotation shaft TM1 is operated as the fixed element, the ninth forward speed stage 9TH is achieved.

The first and third clutches C1 and C3 and the first brake B1 are simultaneously operated at the tenth forward speed stage 10TH. In a state in which the fourth rotation shaft TM4 is connected to the sixth rotation shaft TM6, the second rotation shaft TM2 is connected to the sixth rotation shaft TM6, the input is made into the fourth rotation shaft TM4, and the first rotation shaft TM1 is operated as the fixed element, the tenth forward speed stage 10TH is achieved.

The third and fourth clutches C3 and C4 and the first brake B1 are simultaneously operated at the eleventh forward speed stage 11TH. In a state in which the second rotation shaft TM2 is connected to the sixth and seventh rotation shafts TM6 and TM7, the input is made into the fourth rotation shaft TM4, and the first rotation shaft TM1 is operated as the fixed element, the eleventh forward speed stage 11TH is achieved.

The second and third clutches C2 and C3 and the first brake B1 are simultaneously operated at the twelfth forward speed stage 12TH. In a state in which the second rotation shaft TM2 is connected to the sixth rotation shaft TM6, the seventh rotation shaft TM7 is connected to the eighth rotation shaft TM8, the input is made into the fourth rotation shaft TM4, and the first rotation shaft TM1 is operated as the fixed element, the twelfth forward speed stage 12TH is achieved.

The first and fourth clutches C1 and C4 and the second brake B2 are simultaneously operated at the reverse speed stage REV. In a state in which the fourth rotation shaft TM4 is connected to the sixth rotation shaft TM6, the second rotation shaft TM2 is connected to the seventh rotation shaft TM7, the input is made into the fourth rotation shaft TM4, and the third rotation shaft TM3 is operated as the fixed element, the reverse speed stage REV is achieved.

The planetary gear train according to various embodiments of the present invention may achieve twelve forward speed stages and one reverse speed stage by control of four planetary gear sets PG1, PG2, PG3, and PG4, four clutches C1, C2, C3, and C4, and two brakes B1 and B2.

The planetary gear train according to various embodiments of the present invention may improve the power transmission efficiency and the fuel efficiency through the multiple speed stages of the automatic transmission.

Since a speed stage suitable to engine speed can be achieved due to multiple speed stages, silent driving may be improved.

In addition, since three friction elements operate at each speed and the number of non-operating friction elements is minimized, a friction drag loss is decreased. Therefore, drag torque and power loss may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output shaft outputting changed torque of the engine;
    a first planetary gear set including a first sun gear, a first planet carrier, and a first ring gear;
    a second planetary gear set including a second sun gear, a second planet carrier, and a second ring gear;
    a third planetary gear set including a third sun gear, a third planet carrier, and a third ring gear;
    a fourth planetary gear set including a fourth sun gear, a fourth planet carrier, and a fourth ring gear;
    a first rotation shaft including the first and second sun gears and selectively connected to a transmission housing;
    a second rotation shaft including the first planet carrier;
    a third rotation shaft including the first and fourth ring gears and selectively connected to the transmission housing;
    a fourth rotation shaft including the second planet carrier and directly connected to the input shaft;
    a fifth rotation shaft including the second ring gear and the third and fourth sun gears;
    a sixth rotation shaft including the third planet carrier and selectively connected to the second and fourth rotation shafts;
    a seventh rotation shaft including the third ring gear and selectively connected the second rotation shaft;
    an eighth rotation shaft including the fourth planet carrier and selectively connected to the seventh rotation shaft, and directly connected to the output shaft; and
    six friction elements, wherein each of the six friction elements are disposed to selectively connect at least one of the first to eighth rotation shafts with another rotation shaft of the first to eighth rotation shafts or the transmission housing,
    wherein the six friction elements comprise:
        a first clutch interposed between the fourth rotation shaft and the sixth rotation shaft;
        a second clutch interposed between the seventh rotation shaft and the eighth rotation shaft;
        a third clutch interposed between the second rotation shaft and the sixth rotation shaft;
        a fourth clutch interposed between the second rotation shaft and the seventh rotation shaft;
        a first brake interposed between the first rotation shaft and the transmission housing; and
        a second brake interposed between the third rotation shaft and the transmission housing.

2. The planetary gear train of claim 1, wherein the first, second, third, and fourth planetary gear sets comprise single pinion planetary gear sets.

3. The planetary gear train of claim 1, wherein the first, second, third, and fourth planetary gear sets are disposed sequentially from an engine side.

4. The planetary gear train of claim 1, wherein shift speed stages are achieved by selectively operating the six friction elements and comprise:
    a first forward speed stage achieved by simultaneous operation of the third and fourth clutches and the second brake;
    a second forward speed stage achieved by simultaneous operation of the second and fourth clutches and the second brake;
    a third forward speed stage achieved by simultaneous operation of the second clutch and the first and second brakes;
    a fourth forward speed stage achieved by simultaneous operation of the first and second clutches and the second brake;
    a fifth forward speed stage achieved by simultaneous operation of the first and second clutches and the first brake;
    a sixth forward speed stage achieved by simultaneous operation of the first, second, and fourth clutches;
    a seventh forward speed stage achieved by simultaneous operation of the first and fourth clutches and the first brake;
    an eighth forward speed stage achieved by simultaneous operation of the first and third clutches and the first brake;
    a ninth forward speed stage achieved by simultaneous operation of the third and fourth clutches and the first brake;
    a tenth forward speed stage achieved by simultaneous operation of the second and third clutches and the first brake; and
    a reverse speed stage achieved by simultaneous operation of the first and third clutches and the second brake.

5. The planetary gear train of claim 1, wherein shift speed stages achieved by selectively operating the six friction elements comprise:
    a first forward speed stage achieved by simultaneous operation of the first and third clutches and the second brake;
    a second forward speed stage achieved by simultaneous operation of the third and fourth clutches and the second brake;
    a third forward speed stage achieved by simultaneous operation of the second and third clutches and the second brake;

a fourth forward speed stage achieved by simultaneous operation of the second and fourth clutches and the second brake;
a fifth forward speed stage achieved by simultaneous operation of the second clutch and the first and second brakes;
a sixth forward speed stage achieved by simultaneous operation of the first and second clutches and the second brake;
a seventh forward speed stage achieved by simultaneous operation of the first and second clutches and the first brake;
an eighth forward speed stage achieved by simultaneous operation of the first, second, and fourth clutches;
a ninth forward speed stage achieved by simultaneous operation of the first and fourth clutches and the first brake;
a tenth forward speed stage achieved by simultaneous operation of the first and third clutches and the first brake;
an eleventh forward speed stage achieved by simultaneous operation of the third and fourth clutches and the first brake;
a twelfth forward speed stage achieved by simultaneous operation of the second and third clutches and the first brake; and
a reverse speed stage achieved by simultaneous operation of the first and fourth clutches and the second brake.

6. A planetary gear train of an automatic transmission for a vehicle, comprising:
an input shaft receiving torque of an engine;
an output shaft outputting changed torque of the engine;
a first planetary gear set including a first sun gear, a first planet carrier, and a first ring gear;
a second planetary gear set including a second sun gear, a second planet carrier, and a second ring gear;
a third planetary gear set including a third sun gear, a third planet carrier, and a third ring gear;
a fourth planetary gear set including a fourth sun gear, a fourth planet carrier, and a fourth ring gear;
a first clutch selectively connecting the second planet carrier and the third planet carrier;
a second clutch selectively connecting the third ring gear and the fourth planet carrier;
a third clutch selectively connecting the first planet carrier and the third planet carrier;
a fourth clutch selectively connecting the first planet carrier and the third ring gear;
a first brake selectively connecting the first and second sun gears and the transmission housing; and
a second brake selectively connecting the first ring gear and the transmission housing,
wherein the input shaft is directly connected to the second planet carrier,
the output shaft is directly connected to the fourth planet carrier,
the first sun gear is directly connected to the second sun gear,
the first ring gear is directly connected to the fourth ring gear, and
the second ring gear and the third sun gear are directly connected to the fourth sun gear.

7. The planetary gear train of claim 6, wherein the first, second, third, and fourth planetary gear sets comprise single pinion planetary gear sets.

8. The planetary gear train of claim 6, wherein the first, second, third, and fourth planetary gear sets are disposed sequentially from an engine side.

9. The planetary gear train of claim 6, wherein shift speed stages that are achieved by selectively operating the first, second, third, and fourth clutches and the first and second brakes comprise:
a first forward speed stage achieved by simultaneous operation of the third and fourth clutches and the second brake;
a second forward speed stage achieved by simultaneous operation of the second and fourth clutches and the second brake;
a third forward speed stage achieved by simultaneous operation of the second clutch and the first and second brakes;
a fourth forward speed stage achieved by simultaneous operation of the first and second clutches and the second brake;
a fifth forward speed stage achieved by simultaneous operation of the first and second clutches and the first brake;
a sixth forward speed stage achieved by simultaneous operation of the first, second, and fourth clutches;
a seventh forward speed stage achieved by simultaneous operation of the first and fourth clutches and the first brake;
an eighth forward speed stage achieved by simultaneous operation of the first and third clutches and the first brake;
a ninth forward speed stage achieved by simultaneous operation of the third and fourth clutches and the first brake;
a tenth forward speed stage achieved by simultaneous operation of the second and third clutches and the first brake; and
a reverse speed stage achieved by simultaneous operation of the first and third clutches and the second brake.

10. The planetary gear train of claim 6, wherein shift speed stages that are achieved by selectively operating the first, second, third, and fourth clutches and the first and second brakes comprise:
a first forward speed stage achieved by simultaneous operation of the first and third clutches and the second brake;
a second forward speed stage achieved by simultaneous operation of the third and fourth clutches and the second brake;
a third forward speed stage achieved by simultaneous operation of the second and third clutches and the second brake;
a fourth forward speed stage achieved by simultaneous operation of the second and fourth clutches and the second brake;
a fifth forward speed stage achieved by simultaneous operation of the second clutch and the first and second brakes;
a sixth forward speed stage achieved by simultaneous operation of the first and second clutches and the second brake;
a seventh forward speed stage achieved by simultaneous operation of the first and second clutches and the first brake;
an eighth forward speed stage achieved by simultaneous operation of the first, second, and fourth clutches;

a ninth forward speed stage achieved by simultaneous operation of the first and fourth clutches and the first brake;

a tenth forward speed stage achieved by simultaneous operation of the first and third clutches and the first brake;

an eleventh forward speed stage achieved by simultaneous operation of the third and fourth clutches and the first brake;

a twelfth forward speed stage achieved by simultaneous operation of the second and third clutches and the first brake; and a reverse speed stage achieved by simultaneous operation of the first and fourth clutches and the second brake.

* * * * *